United States Patent [19]

Bennett

[11] 4,453,905

[45] Jun. 12, 1984

[54] PLASTICS RECYCLING APPARATUS

[76] Inventor: Bobby B. Bennett, Rte. 9, Box 130, Reidsville, N.C. 27320

[21] Appl. No.: 499,835

[22] Filed: Jun. 1, 1983

[51] Int. Cl.³ .............................................. B29F 3/04
[52] U.S. Cl. ................................ 425/192 R; 210/236; 210/773; 366/79; 425/197
[58] Field of Search ................... 425/190, 191, 192 R, 425/192 S, 461, 463, 464, 197, 198; 366/79; 210/236, 773

[56] References Cited

U.S. PATENT DOCUMENTS

| | | | |
|---|---|---|---|
| 1,935,200 | 11/1933 | Bower | 425/464 |
| 2,446,979 | 8/1948 | McLellan | 425/190 |
| 2,499,913 | 3/1950 | Gordon | 425/192 |
| 2,895,167 | 7/1959 | Paggi | 425/197 |
| 2,962,759 | 12/1960 | Maccaferri | 425/197 |
| 3,114,169 | 12/1963 | Palmer et al. | 425/198 |
| 3,451,102 | 6/1969 | Chomitz et al. | 425/464 |
| 3,455,357 | 7/1969 | Zink | 425/197 |
| 4,104,958 | 8/1978 | Manser et al. | 425/198 |

FOREIGN PATENT DOCUMENTS

| | | | |
|---|---|---|---|
| 2904158 | 7/1980 | Fed. Rep. of Germany | 425/197 |
| 2947673 | 6/1981 | Fed. Rep. of Germany | 425/197 |
| 21089 | 7/1929 | United Kingdom | 425/198 |
| 610598 | 10/1948 | United Kingdom | 425/197 |

*Primary Examiner*—Willard E. Hoag

[57] ABSTRACT

Plastics recycling apparatus in which an elongated tubular body has a core member therein and in which the core member has leading and trailing conical heads for directing the flow of molten material through the elongated tubular body. Inner and outer annular chambers are provided for the flow of material through a wall between the chambers while the material is being heated by energized coils about one of the chambers. The material flows to the discharge under pressure and passes through discharge orifices to form plastic ribbons which are cooled and then cut into pellets for reuse.

7 Claims, 4 Drawing Figures

PLASTICS RECYCLING APPARATUS

This invention relates to a plastics recycling apparatus in which scrap polyethylene and polypropylene materials having thermoplastic properties will be melted and caused to flow under pressure through an elongated tubular body and screen to filter out impurities while flowing in an axial direction for ultimate discharge and continuous mixing through discharge orifices in which continuous ribbons of plastic material are formed, cooled, at least partially, before quenching and being cut into pellets for reuse for molded products.

BACKGROUND OF THE INVENTION

The spiraling costs of plastic materials through ever increasing cost of petroleum products has necessitated reclamation of polyethylene and polypropylene scrap of all kinds which may be reused for numerous products that do not require the virgin material. The ever increasing demand for polyethylene and polypropylene products of various types may be reduced in cost substantially by using recycled materials which have been carefully controlled.

Various types of extruders which include screen changers, cleanable filters, thermal treatment of plastic materials as well as apparatus for recovering scraps of thermoplastic materials are disclosed in the prior art which include U.S. Pat. Nos. 3,480,997; 3,583,453; 3,653,419; 3,675,934; 3,962,092; 4,025,434; 4,167,384; 4,170,446; 4,189,291; and 4,257,901, among others.

OBJECTIVES OF THE PRESENT INVENTION

The present invention has for its primary objective the recycling of plastic materials of polyethylene and polypropylene in a very simple, economical and efficient system for making available the recycled plastics for reutilization in numerous plastic products where new materials are not essential.

Another objective of the present invention is to provide a low cost and efficient recycling apparatus for handling substantial quantities of scrap thermoplastic polyethylene and polypropylene products and extruding ribbons of the recycled material for reuse after cutting into suitably sized pellets that will be accommodated in various types of supply hoppers for molding equipment.

Other objectives and many of the attendant advantages of this invention will become more readily apparent to those skilled in the plastic art when considered in conjunction with the accompanying drawings, detailed description of the preferred embodiment, and the appended claims in which modifications and equivalents are contemplated.

SUMMARY OF THE INVENTION

The present invention for a plastics recycling apparatus includes an elongated tubular member through which heated scrap plastic may be forced under high pressure from an inlet pump in the range of 2000 psi and in which the density of the plastic material ranges from 0.955 to 0.960 as well as other densities. A cylindrical section of a tubular body is supported by suitable flanges in the flow of materials and is provided with a number of longitudinally-spaced rows in which each row is a circumferential indentation having spaced inlet openings for receiving molten plastic material from an inlet annular chamber which surrounds the rows of inlet openings. A core member is cooperatively received in the tubular body and is provided with leading and trailing conical heads for diverting material flow into the entrance annular chamber formed by an encircling housing. A discharge annular chamber is formed between the core member and the tubular body in which the inlet openings pass with the flow of material converging at the trailing conical head of the core member for passage to a series of discharge orifices from which the material will be formed into plastic ribbons that will solidify and cool whether through the ambient air or through quenching in a cooling medium ultimately to be cut into pellets for reuse.

A circumferential housing that encloses the inlet openings is provided with heating elements to maintain the desired temperature for the materials flowing through the chambers and various openings with the housing being slidable to expose a filter screen wrapped around the inlet openings to eliminate impurities from the material flow.

DETAILED DESCRIPTION OF THE PREFERRED EMBODIMENT

Figure 1:
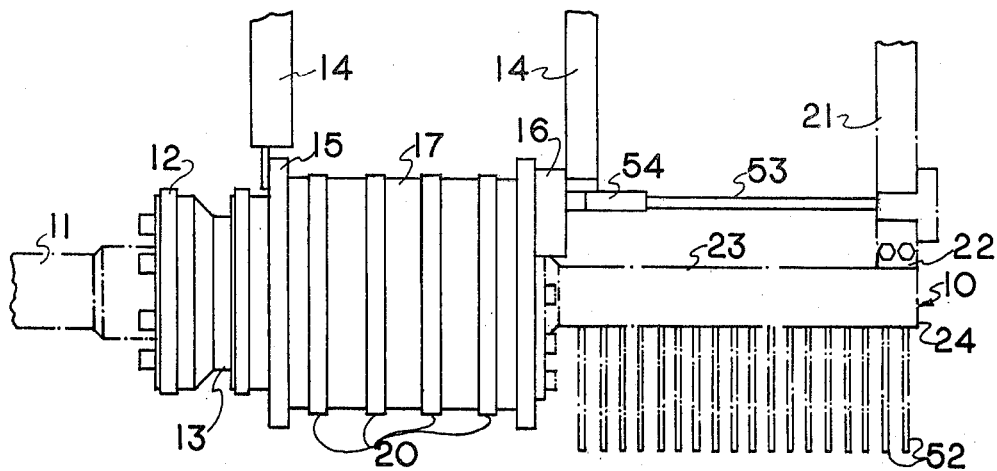
FIG. 1 is a front partial elevational view of a plastics recycling apparatus emboding this invention with portions shown in outlined form.
Figure 3:
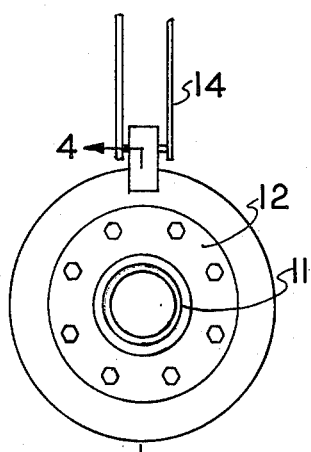
FIG. 3 is a left end elevational view of FIG. 1.
Figure 2:
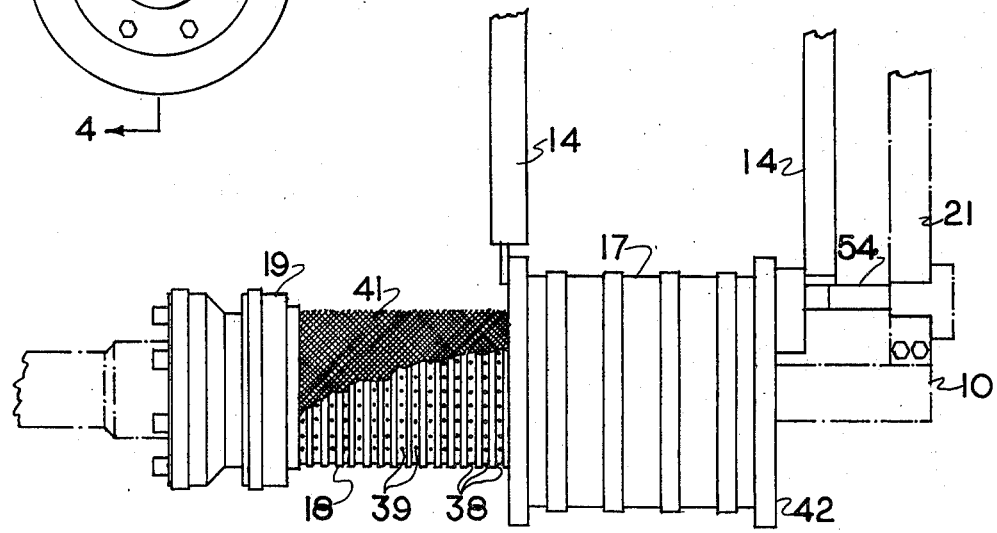
FIG. 2 is a view similar to FIG. 1 with the circumferential housing displaced to the right laterally to expose portions of the interior of the apparatus.

Referring to the drawing and particularly to FIGS. 1 and 2, there is illustrated a plastics recycling apparatus 10 in which molten plastic of either polyethylene or polyurethane scrap material is subjected to elevated temperatures and may be pumped under pressure in the range of 2000 psi as a liquid flowing material into the inlet line 11 before passage beyond the flanged connection 12 of the inlet to the elongated tubular body 13 of the recycling apparatus. Vertical support members 14 are securely fastened by suitable means to the encircling plate 15 and to the block 16 mounted on the cylindrical or circumferential housing 17 which surrounds the inner elongated tubular body 18 and the closure member 19. A series of longitudinally-spaced encircling heating elements 20 are supported on the insulated housing 17 through which housing the electrically energized heating elements 20 will cause elevation and maintenance of an operating temperature of approximately 400° Fahrenheit within the enclosure of the housing 17. The vertical support member 21 is secured by suitable lugs to the projection 22 on the extending discharge tubular sleeve member 23 whose end 24 is sealed closed. The upper ends of the supporting memers 14 and 21 will be securely fastened to a beam or other overhead supporting structure (not shown).

Figure 4:
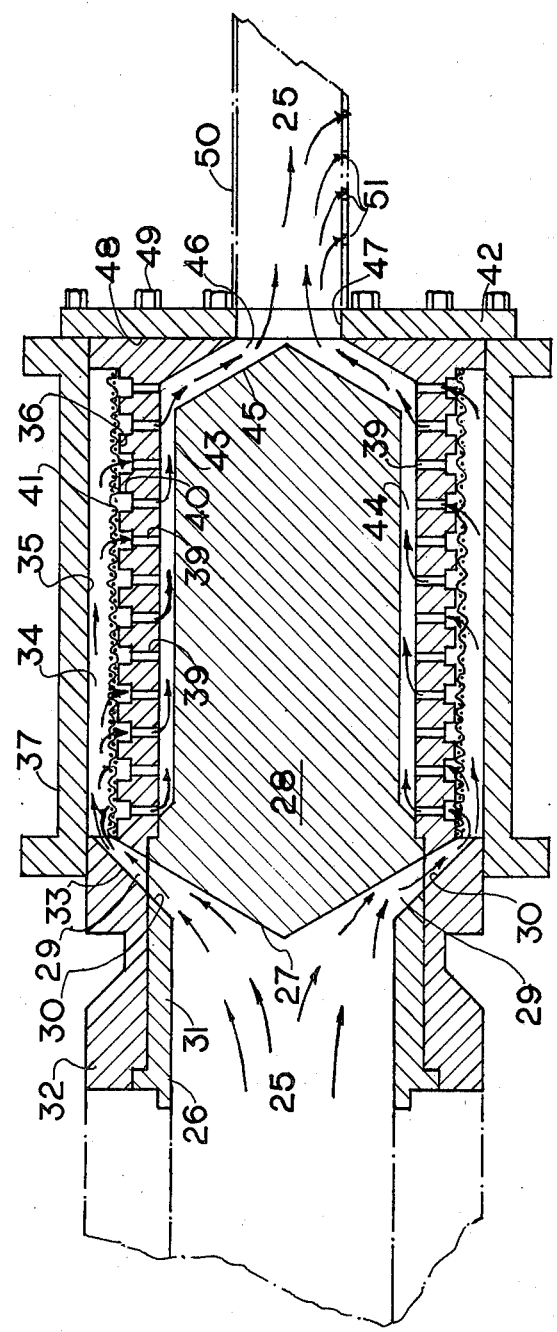
FIG. 4 is an enlarged partial longitudinal view, with portions removed, taken substantially along line 4—4 of FIG. 3.

As shown in FIG. 4, a material flow depicted by the arrows in the interior 26 of the elongated tubular body will be diverted by the leading conical head 27 on the core member 28 that is positioned within the tubular body to divert the flow of material 25 into the conical passageway 29 formed between the conical surface of head 27 and the frusto-conical shaped end section 30 formed by the tubular sleeve 31 and the outer sleeve member 32 in which the inclined surface 33 is continuous around its periphery. An entrance annular chamber 34 is formed between the inner cylindrical surface 35 of the housing 17 and the cylindrical surface of the tubular body 36 which is suitably undercut to provide the requisite annular volume for the flow of materials throughout the longitudinal length of the chamber 34. The heating elements circumscribing the outer surface 37 of the housing 17 and the insulation have been omitted in FIG. 4. A number of rows 38 are machined into the circumferential surface of the tubular body 32 and they are longitudinally spaced from each other. Inlet openings 39 pass through the tubular body and are circumferentially spaced from each other in each row 38. However, each inlet opening 39 is provided with an enlarged entrance recess 40 into which the flow of material will pass initially after being filtered through the interstices of the stainless steel wire mesh screen 41 that circumferentially surrounds the openings 39 and 40 to prevent foreign matter from passing through the mesh barrier or screen 41. It has been found desirable to employ a double screen of stainless steel wire with 20 mesh per inch for the inner layer and a second outer enveloping screen having 40 to 100 mesh openings per square inch. Periodic scrubbing of the screen 41 may be required and the housing 17 and supporting members 14 with the end flange 42 being slidably displaced to the right thereby exposing the screen 41 for cleansing.

The core member 28 is suitably undercut to form a reduced diameter 43 which will provide the discharge annular chamber 44 for receiving the flow of materials thereinto from the discharge ends of the openings 39. The conical trailing end 45 of the core member is suitably positioned to provide for the frusto-conical discharge passage 46 which leads through the circular discharge opening 47 in the housing flange 42 that is securely retained in a seated position during operation against the end portion 48 of the tubular body. Lug nuts 49 on the flange 42 may be threadably connected into the end members 48 depending upon the pessures exerted internally of the system.

The flow of material 25 will exit through the opening 47 into the discharge tube 50 which extends axially from the main elongated tubular body and is provided with a series discharge orifices 51 that are longitudinally spaced from each other and from which the molten plastic recycled material will be extruded in ribbon-like form whose cross-section may vary depending upon the configuration of the orifices 51. The extruded material will solidify usually to some extent in the ambient atmosphere although a quench trough (not shown) containing water may be suitably positioned beneath the discharge orifices further to quench and cool the extruded ribbons 52. The solidified and cooled ribbons may be chooped into pellets for reuse.

Heating elements 20 may be standard nichrome or other electrical resistance coils for heating the annular chamber 34 to the desired temperature and either 220 volts or 440 volts may be used to energize such electrical elements. Suitable temperature control means will be provided to regulate the temperature in the annular chamber 34 by controlling the energy or electrical power supply to the heating elements 20.

A guide bar 53 is supported above the discharge tube 23 shown in FIG. 1 over which the sleeve 54 will be guidably displaced as the housing 17 is moved from the position shown in FIG. 1 to the position shown in FIG. 2.

The temperature of 400° F. may be increased or decreased depending upon the materials that are being used. The ribbon extruded has a diameter of 0.150 inches and the pellets may be chopped to one-eighth inch with the orifice openings being in the range of one-eighth inch although larger and smaller openings may be employed.

I claim:

1. A plastic recycling apparatus comprising; an elongated tubular body for conducting material flow, a core member in said tubular body having a leading conical head for diverting material flow, a series of circumferentially-spaced inlet openings in said tubular body downstream of said conical head, a circumferential housing enclosing said inlet openings and forming an entrance annular chamber for material flow therebetween, a discharge annular chamber between said core member and said tubular body interior for receiving material flow from said series of inlet openings with said entrance and discharge annular chambers being concentrically positioned, material flow inlet means adjacent to said conical head and said tubular body communicating with said entrance annular chamber, a series of material flow discharge orifices downstream of said tubular body, and a material flow discharge means communicating with said discharge annular chamber and said discharge orifices whereby molten plastic flow under pressure from said inlet means to said discharge orifices extrude plastic ribbons for quenching and cutting for reuse, said tubular body having filter means thereover and there being a flow path for but a single pass of said material through said tubular member.

2. A plastics recycling apparatus as claimed in claim 1, a series of spaced heater elements mounted on and circumscribing said circumferential housing for heating the plastic materials flowing through said first entrance annular chamber.

3. A plastics recycling apparatus as claimed in claim 1, said circumferential housing being axially slidable to expose said entrance annular chamber.

4. A plastics recycling apparatus as claimed in claim 1, said filter means surrounding said inlet openings in said tubular body and including a mesh screen to retain foreign matter and unmelted materials thereon.

5. A plastics recycling apparatus as claimed in claim 1, said series of circumferentially-spaced inlet openings including a plurality of rows of said series of circumferentially-spaced inlet openings communicating with said entrance annular chamber.

6. A plastics recycling apparatus as claimed in claim 1, said core member having a trailing conical head for converging the flow of material to said material discharge means in the material flow path to said discharge orifices.

7. A plastics recycling apparatus as claimed in claim 1, means for supporting said circumferential housing, and guide means for slidably retaining said housing.

* * * * *